United States Patent
Saito et al.

(10) Patent No.: US 6,873,350 B2
(45) Date of Patent: Mar. 29, 2005

(54) IMAGE FORMING APPARATUS AND IMAGE FORMING METHOD

(75) Inventors: Masanobu Saito, Chiba (JP); Satoru Inami, Chiba (JP); Seiichi Shinohara, Chiba (JP); Takayuki Namiki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,119

(22) Filed: Jun. 25, 2001

(65) Prior Publication Data

US 2002/0036688 A1 Mar. 28, 2002

(30) Foreign Application Priority Data

Jun. 26, 2000 (JP) ........................................ 2000-191815

(51) Int. Cl.[7] .............................................. B41J 2/435
(52) U.S. Cl. ...................................................... 347/239
(58) Field of Search ................................ 347/128, 135, 347/236, 237, 239, 247, 252, 253, 255; 358/3.26, 3.27, 296

(56) References Cited

U.S. PATENT DOCUMENTS 5,430,472 A * 7/1995 Curry ........................ 347/232

FOREIGN PATENT DOCUMENTS

JP 4-51043 2/1992
JP 8-317157 11/1996

* cited by examiner

Primary Examiner—Michael Nghiem
(74) Attorney, Agent, or Firm—Fitzpatrick, Cella, Harper & Scinto

(57) ABSTRACT

There is provided an image forming apparatus such as a latent image forming apparatus, in which the density of a half tone is stable independent on a write position of a main scanning line, even if a plurality of semiconductor lasers are used. The image forming apparatus has a latent image forming unit for pulse-width-modulating a drive signal of the semiconductor laser in response to the write position of image data. The latent image forming unit has an image sorting circuit for sorting the image data into an odd line and an even line, a memory for storing a turning on position, a pulse generating position control circuit for generating a pulse generating position signal, a PWM circuit for generating a triangular wave in accordance with the pulse generating position signal, and a beam-A-circuit and a beam-B-circuit, which control beams from the semiconductor laser.

9 Claims, 19 Drawing Sheets

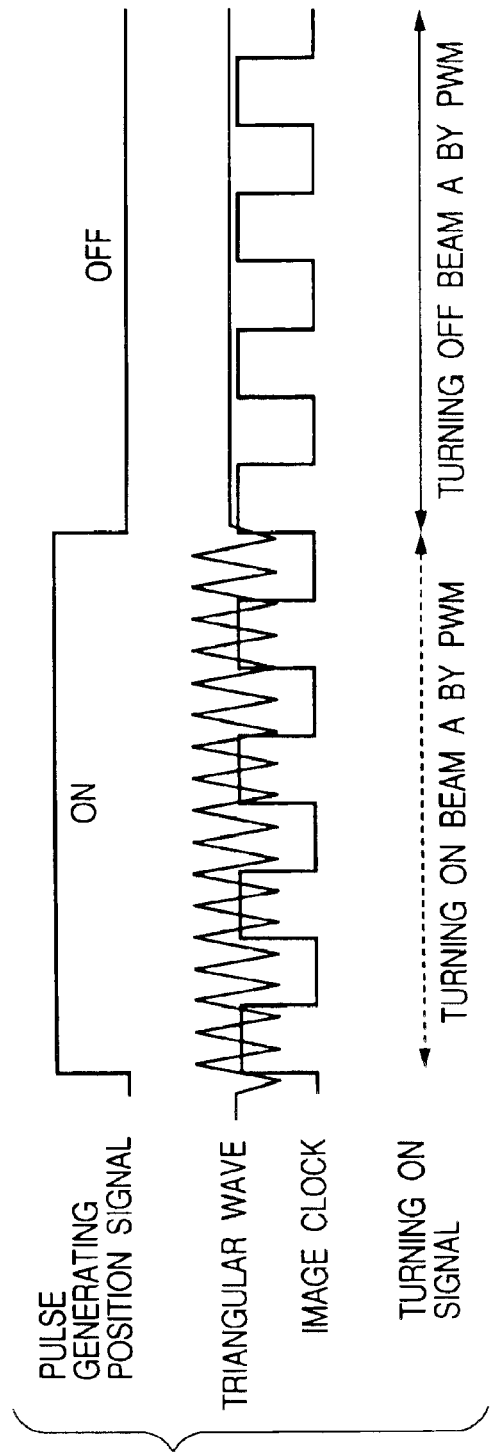

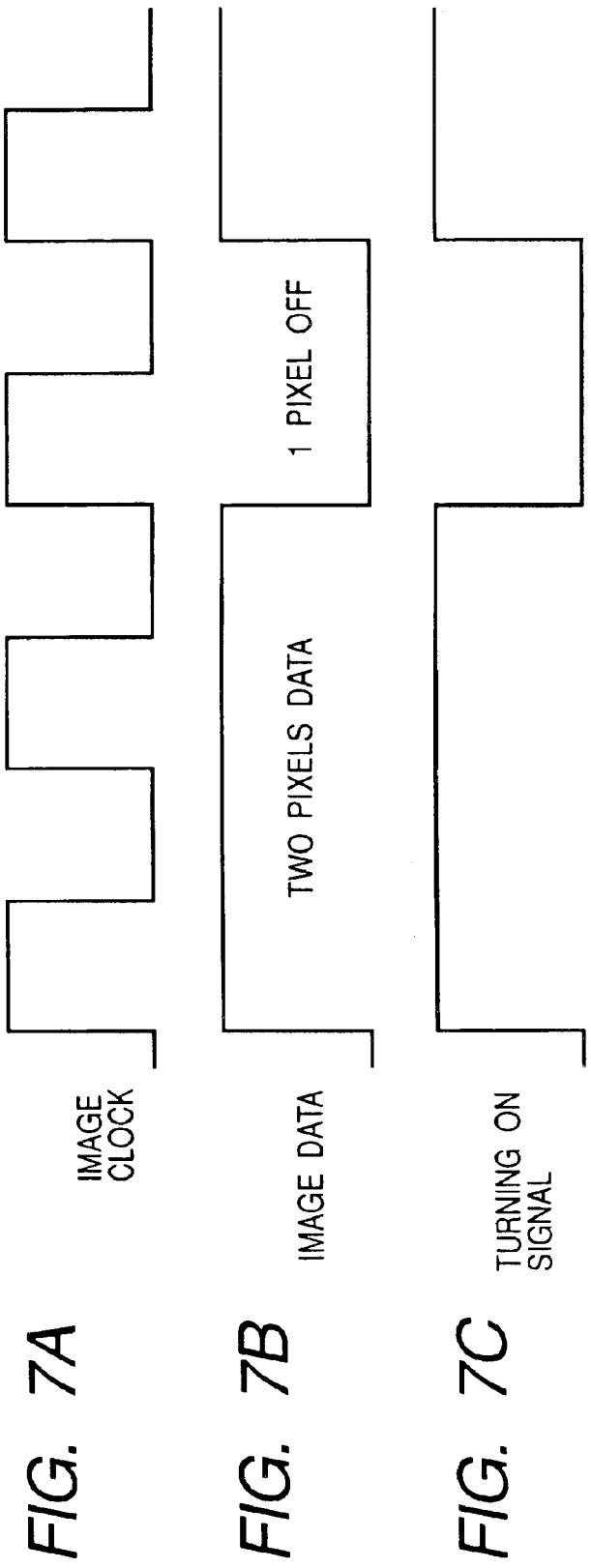

IMAGE CLOCK

BEAM A IMAGE DATA

TRIANGULAR WAVE

TURNING ON SIGNAL

BEAM B IMAGE DATA

TRIANGULAR WAVE

BEAM B TURNING ON SIGNAL

MEASURED INTENSITY OUTPUT OF
SINGLE IRRADIATION OF BEAM A

MEASURED INTENSITY OUTPUT OF
SINGLE IRRADIATION OF BEAM B

MEASURED INTENSITY OUTPUT OF
BEAM A AND B SIMULTANEOUS IRRADIATION

IMAGE FORMING APPARATUS AND IMAGE FORMING METHOD

BACKGROUND OF THE INVENTION

1. Field of the Invention

The present invention relates to an image forming apparatus, and in particular, an image forming apparatus for forming an image by scanning a surface to be scanned as an image support body such as a photosensitive body or an electrostatic recording body with a modulated light flux and also to an image forming method.

2. Related Background Art

In a conventional image forming apparatus using an electrophotographic system in which a visual image is formed by scanning of charging, exposure, and development, as a means of forming an electrostatic latent image after primary charging to the electrophotographic photosensitive body as the image bearing body, a means for performing exposure using a semiconductor laser becomes widely practical use. In the means for forming the electrostatic latent image, a laser chip composed of a laser diode and a photo diode sensor is used. An output signal from the photo diode sensor is fed back to a bias power source of the laser diode and thus automatic control for an amount of bias current is performed to stabilize laser light.

Recently, as the printing speed of the image forming apparatus becomes faster, a means for forming the electrostatic latent image using a multi-laser for simultaneously emitting a plurality of laser lights in one main scanning becomes practical use. For example, even in the multi-laser system using two lasers, the above structure is used, this is composed of two pairs of laser light emitting diodes and photo diode sensors to stabilize laser lights.

On the other hand, various image signal processing techniques are used for image improvement. As one of these techniques, in the case where a digital image signal is binarized to form the image, a pulse width modulation (PWM) method is proposed such that the digital image signal is converted into an analog signal and then compared with a periodic pattern signal such as a triangle wave to produce a binary signal pulse-width-modulated. The invention in that the PWM is used for a multi-beam printer type laser printer is disclosed in Japanese Patent Application Laid-open No. 08-317157. According to the invention disclosed therein, in order to prevent an unevenness density due to an individual difference of respective lasers in the multi-beam, a pattern signal of the respective lasers is corrected with the pulse width modulation. That is, there is the case where the respective beams are individually pulse-width-modulated in response to respective beam properties. Thus, light intensities of the respective lasers are kept and thus light portion potentials in respective laser scans are equaled to suppress the density unevenness.

However, in the multi-beam, even if no individual difference of the pair of lasers is produced, there is a problem that a half tone density is different. This is a new problem that, even in the case of the same image pattern, if a write starting position in a sub scanning direction is shifted by one, a half tone image density becomes different. It is considered that such a phenomenon is caused by non-linearity of a curve (E–V curve) between a light intensity E and a potential V in a photosensitive body. For example, when a light strength is given by I and an exposure time is given by t, the light intensity E is given by an equation E=I×t. Even if the photosensitive body is provided with the same light intensity E, when the light strength I or the exposure time t is changed, there is the case where the sensitivity is different and thus the potential is changed. Thus, the density difference is produced. This is called a reciprocity failure. In relation to this reciprocity failure, an example that the sensitivity is improved when the photosensitive body is irradiated with light having a low intensity for a plurality of times, is reported in Japanese Patent Application Laid-open No. 04-51043.

Hereinafter, an example of a half tone density difference which is produced by the reciprocity failure in the multi-beam will be shown.

FIG. 16 is a schematic view showing a half tone of 2 dots and 2 spaces in the case where beams "A" and "B" are simultaneously irradiated onto a paper. A pair of lasers are defined as the beams "A" and "B". The beam "A" corresponds to a first line as a head of a write position of a paper and the beam "B" corresponds to a second line. After that, the beams "A" and "B" alternately correspond to respective lines. Thus, the beam "A" corresponds to an odd line and the beam "B" corresponds to an even line. The beams "A" and "B" are simultaneously turned ON in a first polygon scanning to scan image data in horizontal lines of 2 dots, and then simultaneously turned OFF in next polygon scanning to provide 2 spaces. Thus, the beams "A" and "B" are repeatedly simultaneous-turned ON and OFF to become a half tone. Note that, in FIG. 16, a pair of lasers in the polygon scanning are separated from each other by dashed lines.

FIG. 17 is a schematic view showing a half tone of 2 dots and 2 spaces in the case where the beams "A" and "B" are alternately irradiated onto a paper. In a first polygon scanning, the beam "A" is turned OFF and the beam "B" is turned ON. Thus, 1 space is provided and image data is scanned in a horizontal line of 1 dot. In the next polygon scanning, the beam "A" is turned ON and the beam "B" is turned OFF. Thus, image data is scanned in a horizontal line of 1 dot and 1 space is provided. Therefore, When a half tone of 1 space and 1 dot and a half tone of 1 dot and 1 space are repeated in succession, the half tone of 2 dots and 2 spaces which is shifted by one line is obtained.

Densities of the half tones of 2 dots and 2 spaces shown in FIGS. 14 and 15 are compared. In the half tone of 2 dots and 2 spaces in the case where two lasers are simultaneously irradiated in the main scanning line direction, as shown in FIG. 14, the density is 1.15. On the other hand, in the half tone of 2 dots and 2 spaces in the case where two lasers are alternately irradiated in the main scanning line direction, the density is 1.21. Thus, the density in the case of the laser simultaneous irradiation is lower than that in the case of the laser alternate irradiation.

In order to find this cause, whether a difference in a light intensity is produced or not is examined. It is considered that the respective lasers are interfered by thermal and electrical crosstalk between the lasers and thus the light intensity is decreased at the simultaneous irradiation. Thus, the laser light intensities in the cases of the simultaneous irradiation and the single shot irradiation are measured and compared.

FIG. 18 shows a measurement value of the light intensity by a pin photo diode in the case where the beam "A" is scanned with a single shot. FIG. 19 shows a measurement value of the light intensity by the pin photo diode in the case where the beam "B" is scanned with a single shot. FIG. 20 shows a measurement value of the light intensity by the pin photo diode in the case where the beams "A" and "B" are simultaneously emitted (turned on) and scanned. In this light intensity measurement, when the light intensity of the beam "A" as shown in FIG. 18 and that of the beam "B" as shown in FIG. 19 are summed, the summed light intensity agrees with the light intensity in the case of the simultaneous irradiation as shown in FIG. 20. As a result, it is found that even if the simultaneous turning on is performed, the light intensities of the multi-beam are stable and not decreased.

Next, whether a difference in a potential of a photosensitive body is produced or not is examined. A spot diameter used here is not sufficiently small. Thus, it is expected that two laser spots are overlapped with each other and a potential in the overlapped portion is different. As the conditions, the spot size of the beam "A" is equal to that of the beam "B" and is 70 $\mu$m in the main scanning direction and 70 $\mu$m in the sub scanning direction. In the image forming apparatus of 1200 dpi, a size of 1 pixel is 21 $\mu$m.

FIG. 21 is a concept view in the case where the light intensity distribution at the simultaneous exposure is converted into the potential distribution through an E–V curve. The beam "A" and the beam "B" are overlapped with each other to become the light intensity of the multi-beam and thus irradiated into the photosensitive body. The light intensity distribution is converted into the potential through the E–V curve. A point remarked here is an overlapped portion of the spots. The beam having the total light intensity is irradiated into the photosensitive body, and simultaneously holes are produced to determine the potential distribution.

FIG. 22 is a concept view in the case where the light intensity distribution at the separate exposure is converted into the potential distribution through the E–V curve. An arrow (1) represents a path in the case where the first beam "A" with a predetermined intensity is irradiated into the photosensitive body to produce holes, and thus a first potential distribution is determined. Also, an arrow (2) represents a path in the case where the next beam "B" is irradiated into the photosensitive body to produce holes, and thus a second potential distribution is determined.

When the case of FIG. 21 is compared with the case of FIG. 22, the total light intensity is the same in the overlapped portion of the spots. However, when the simultaneous irradiation is made, the photosensitive body is exposed to strong light by one shot and thus the potential distribution is determined by one time. On the other hand, even when the photosensitive body is separately irradiated with weak light, the E–V curve becomes a non linear convex form downward. Therefore, the potential can be sufficiently decreased and thus the E–V curve becomes the superposition of two potential distributions. Note that, since the above E–V curve for changing the light intensity to the potential is a curve obtained at solid exposure, it is not exact to apply this curve to the case of the half tone of 2 dots and 2 spaces. Therefore, the E–V curve obtained in the case of 2 dots and 2 spaces is actually measured, and then whether a difference between the simultaneous exposure and the separate exposure is produced or not is examined with respect to the photosensitive body having the E–V curve which becomes the non linear convex form downward.

FIG. 23 shows results obtained by measuring a surface potential of the photosensitive body by changing the light intensity in the cases of 2 dots and 2 spaces by the simultaneous irradiation and the separate irradiation using the beams "A" and "B" in the multi-beam. As can be seen from the graph shown in FIG. 21, a potential curve corresponding to the light intensity in 2 dots and 2 spaces by the simultaneous irradiation is always higher than that in 2 dots and 2 spaces by the separate irradiation and thus the sensitivity in the simultaneous irradiation is deteriorated relatively to the separate irradiation. Concretely, a light intensity set value in the image forming apparatus is generally 3.0 mJ/m$^2$. Then, when two beams are simultaneously irradiated into the photosensitive body, as shown in FIG. 14, a potential of –265 V was obtained. On the other hand, when two beams are separately irradiated into the photosensitive body, as shown in FIG. 15, a potential of –250 V was obtained. Here, since a density is a reverse phenomenon, the density in the potential of –265 V becomes lower than that in the potential of –250 V. As described above, a difference between these potentials corresponds to that between the densities of 1.15 and 1.21. Therefore, when the density in the separate irradiation is adjusted to that in the simultaneous irradiation, it is required that the light intensity in the separate irradiation is decreased to about $\frac{7}{8}$ and thus the light intensity set value is set to be 2.6 mJ/m$^2$.

As described above, in the case of the multi-beam, even if the same light intensity is set in the cases of simultaneous exposure and the separate exposure using two beams, it is found that the potential becomes higher and the sensitivity is deteriorated in the simultaneous exposure relatively to the separate exposure by the reciprocity failure of the photosensitive body. That is, in the overlapped portion of the multi-beam, when the multi-beam is simultaneously emitted (turned on), the light intensities of respective beams are superimposed and then the photosensitive body is irradiated with this multi-beam at once. On the other hand, in the overlapped portion of the multi-beam, the multi-beam is separately emitted (turned on), the photosensitive body is separately irradiated with the respective beams. At this time, a write position in a half tone image is shifted by only one line. However, there is a problem that the sensitivity is deteriorated and the difference in the density is produced in the former relatively to the latter.

SUMMARY OF THE INVENTION

The present invention has been made in view of such a problem, and an object of the present invention is therefore to provide an image forming apparatus and an image forming method, in which a half tone density is stable independent of a write timing of a main scanning line, even when a latent image forming means with a multi-beam is used.

According to a first aspect of the present invention, the present invention characterized in that an image forming apparatus comprising, a scanning means for scanning a photosensitive body using a plurality of semiconductor lasers to form a latent image, and a latent image forming means for pulse-width-modulating a drive signal of the semiconductor lasers in accordance with a write position of the latent image, when exposure is performed such that one of beams from the plurality of semiconductor lasers is partially overlapped with a beam adjacent to one of the beams from the plurality of semiconductor lasers on the photosensitive body.

According to a second aspect of the present invention, in the first aspect of the invention, the present invention characterized in that an image forming apparatus, wherein the latent image forming means does not pulse-width-modulate the drive signal, when at least two of the plurality of semiconductor lasers are simultaneously turned on in one scanning, and the latent image forming means pulse-width-modulates the drive signal, when one of the beams from the plurality of semiconductor lasers which are turned on in one scanning is adjacent to one of the beams from the plurality of semiconductor lasers which are turned on in the next scanning.

According to a third aspect of the present invention, in the first aspect of the invention, there is provided an image forming apparatus, wherein the latent image forming means does not pulse-width-modulate the drive signal, when at least two of the plurality of semiconductor lasers are simultaneously turned on in one scanning, and the latent image forming means pulse-width-modulates the drive signal, when one of the plurality of semiconductor lasers is turned on in one scanning.

According to a fourth aspect of the present invention, there is provided an image forming apparatus comprising, a plurality of emitting means for emitting a plurality of light beams, scanning means for scanning the plurality of light beams emitted from the plurality of emitting means on a common photosensitive body, modulating means for modulating the plurality of light beams in accordance with respective image data, detecting means for detecting a plurality of image pixels which are adjacent to each other in a sub scanning direction and exposed in different main scannings, in accordance with the image data, and exposure intensity control means for relatively decreasing an exposure intensity of the light beams for at least one of the plurality of image pixels detected by the detecting means, in response to a detection result of the detecting means.

According to a fifth aspect of the present invention, there is provided an image forming apparatus comprising, a plurality of emitting means for emitting a plurality of light beams, scanning means for scanning the plurality of light beams emitted from the plurality of emitting means on a common photosensitive body, modulating means for modulating the plurality of light beams in accordance with respective image data, detecting means for detecting a plurality of image pixels which are adjacent to each other in a sub scanning direction and exposed in the same main scanning, in accordance with the image data, and exposure intensity control means for relatively increasing an exposure intensity of the light beams for at least one of the plurality of image pixels detected by the detecting means, in response to a detection result of the detecting means.

These and after objects, features, and advantages of the present invention will be apparent from the detailed description in connection to the accompany drawings, as shown below.

BRIEF DESCRIPTION OF THE DRAWINGS

FIG. 5 shows a state that a turning on time is shortened so as to modulate the image data of a beam "A" and decrease a half tone density in a beam-A-circuit according to the embodiment;

FIGS. 7A, 7B and 7C show one example of a time chart in the case where the beam-A-circuit is not controlled by the PWM circuit, according to the embodiment;

DETAILED DESCRIPTION OF THE PREFERRED EMBODIMENTS

Figure 1:
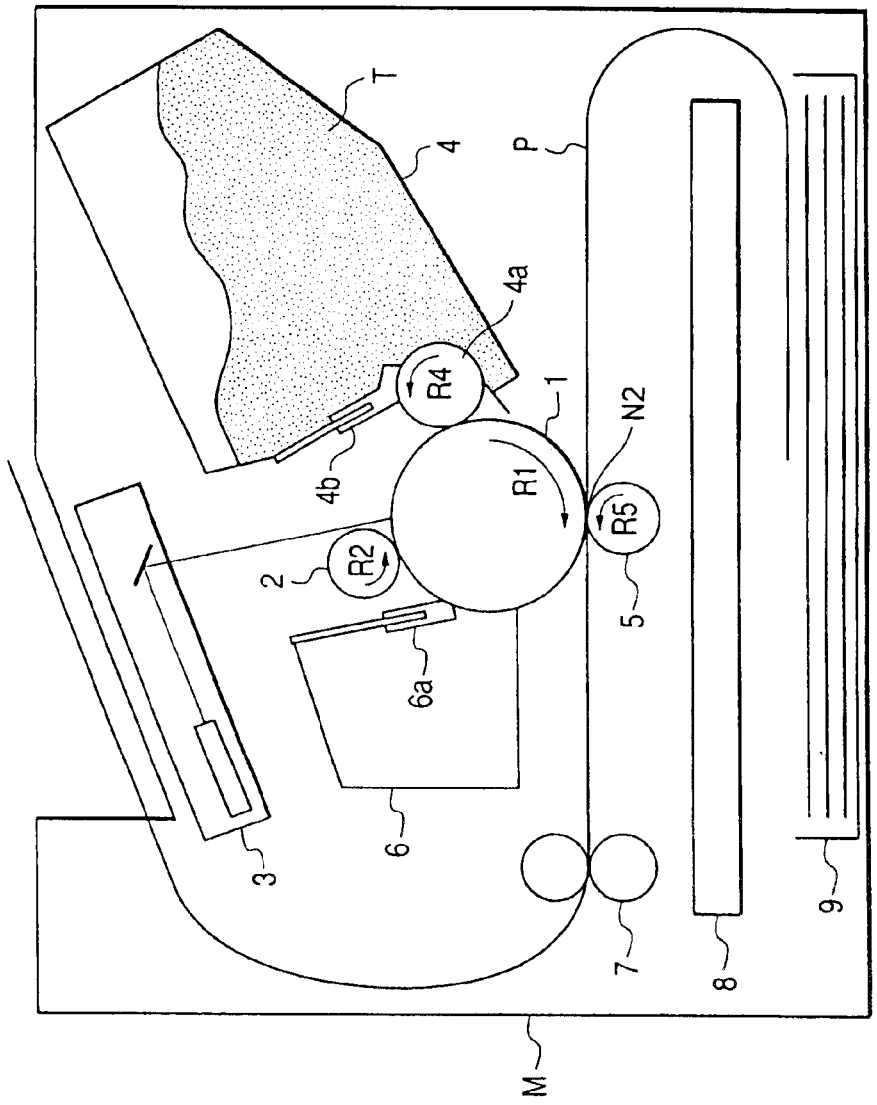
FIG. 1 is a schematic cross sectional view of a laser printer as an image forming apparatus according to an embodiment.

Hereinafter, embodiments of the present invention will be described in detail with reference to the drawings.
(Embodiment 1)
FIG. 1 is a schematic cross-sectional view of a laser printer as an image forming apparatus according to the present invention. The image forming apparatus main body M represents a printer engine. A photosensitive drum 1 is a cylindrical electrophotographic photosensitive body and is rotationally driven by a driver means (not shown) in a direction indicated by an arrow R1. A charging member 2 is located in contact with the surface of the photosensitive drum 1 and is rotated in a direction indicated by an arrow R2. After the photosensitive drum 1 is uniformly charged by the charging member 2, an electrostatic latent image is formed on the surface of the photosensitive drum 1 by a latent image forming unit 3. A developing unit 4 has a hopper as a toner storage unit for storing a toner T and a developing sleeve 4a as a toner support body and develops the electrostatic latent image formed on the photosensitive drum 1. A developing blade 4b as a toner control member is provided in the vicinity of the developing sleeve 4a, which is rotated in a direction indicated by an arrow R4. An engine control unit 8 has a power source for driving the image forming apparatus and a high voltage supply circuit for supplying a bias for image formation. By the engine control unit 8, a developing bias obtained by superimposing an alternating current bias on a direct current bias is provided between the photosensitive drum 1 and the developing sleeve 4a. Thus, the toner is applied to the electrostatic latent image formed on the photosensitive drum 1 to develop it as a toner image. The toner image on the photosensitive drum 1 is transferred to a transfer material P such as paper by a transfer unit 5, which is rotated in a direction indicated by an arrow R5. The transfer material P is stored in a paper feeding cassette 9, fed by a paper feed roller (not shown), and is carried to a transfer nip N2 between the photosensitive drum 1 and the transfer unit 5. The toner image transferred to the transfer material P is carried to a fixing unit 7 together with the transfer material P and then heated and pressed thereby. Thus, the toner image is fixed to the transfer material P to become a recorded image. On the other hand, after the transfer of the toner image, toner remaining on the photosensitive drum 1 without being transferred to the transfer material P (hereinafter referred to as transfer residual toner) is removed by a cleaning blade 6a in a cleaning unit 6. The photosensitive drum 1 in which the transfer residual toner on the surface is removed is used for the next image formation that is started from the charging by the charging member 2, and thus a series of image forming processes as described above is repeated.

Figure 2:
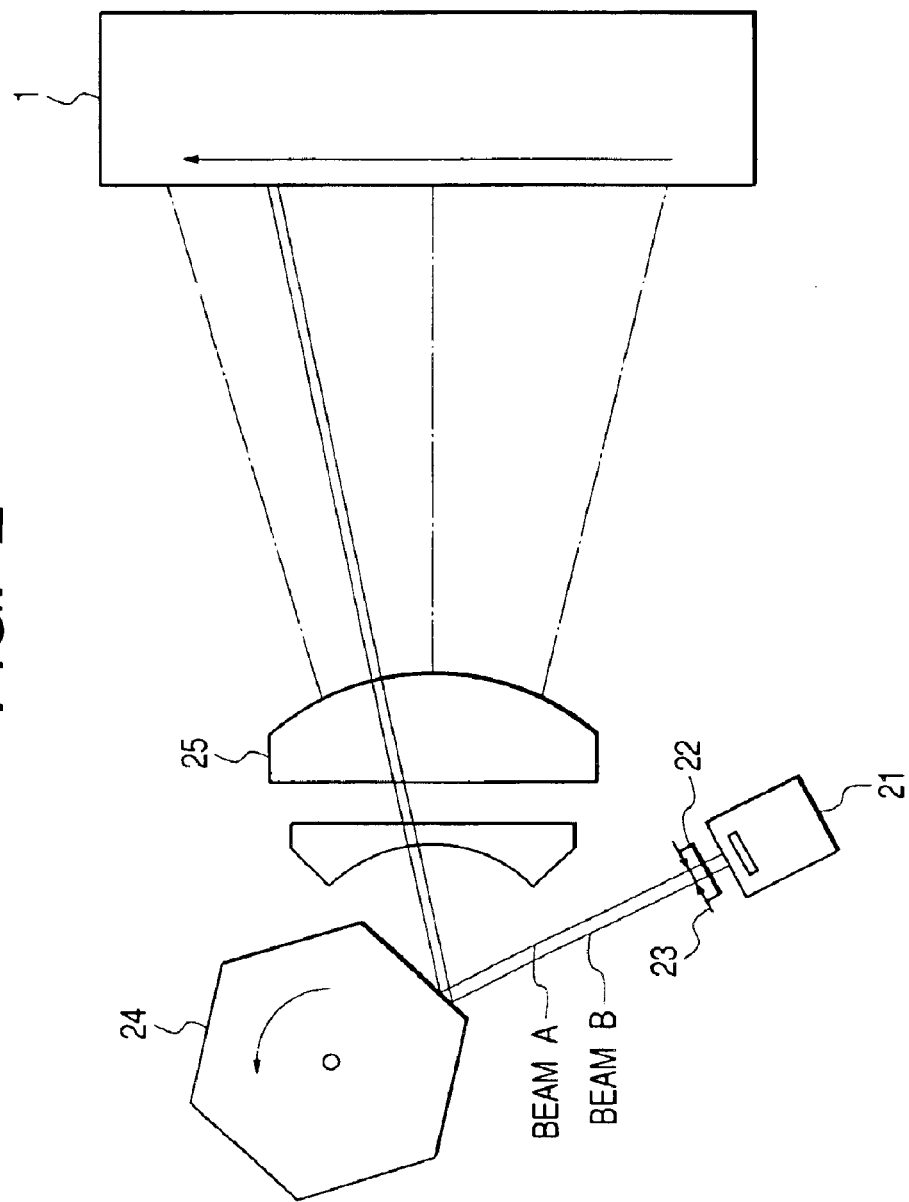
FIG. 2 shows details of a latent image forming unit in the laser printer as the image forming apparatus according to the embodiment.

FIG. 2 shows details of the latent image forming unit in the laser printer as the image forming apparatus according to the present invention. Laser light emitted from a semiconductor laser 21 is changed into substantially parallel light by a collimator lens 22 and a lens stop 23. The parallel light with a predetermined beam size is incident to a rotatory polygon mirror 24. The rotatory polygon mirror 24 is rotated in a direction indicated by an arrow at an equiangular speed revolution. The laser light incident to the mirror 24 in response to this rotation is reflected as a deflection beam in that a reflection angle is continuously changed. The laser light as the deflection beam is subjected to a condensing operation by an f-θ lens 25. Simultaneously, the f-θ lens 25 corrects a distortion aberration so as to keep a linearity of time in scanning. The scanning is made at a uniform speed in a direction indicated by an arrow in the photosensitive body 1 (this scanning by the laser light is called a main scanning). The laser light is turned ON and OFF so as to form the latent image. The semiconductor laser 21 used here is a chip having two laser diodes and can form the latent images of two lines by the main scanning in one time. Here, the laser lights from these two lasers are defined as the beams "A" and "B". As the conditions, the spot size of the beam "A" is equal to that of the beam "B" and is 70 μm in the main scanning direction and 70 μm in the sub scanning direction. In the image forming apparatus main body of 1200 dpi, a size of 1 pixel is 21 μm. The beam "A" corresponds to a first line as the head of a write position of a paper and the beam "B" corresponds to a second line. Note that the head of the write position indicates that of an image printable region and the head line is not changed even if a blank space is present. Hereinafter, the beams "A" and "B" alternately correspond to respective lines. Thus, the beam "A" corresponds to an odd line and the beam "B" corresponds to an even line.

Next, in order to form a half tone line with an even density, a method and a circuit for controlling pulse widths of beams from the semiconductor laser 21 will be described.

Figure 3:
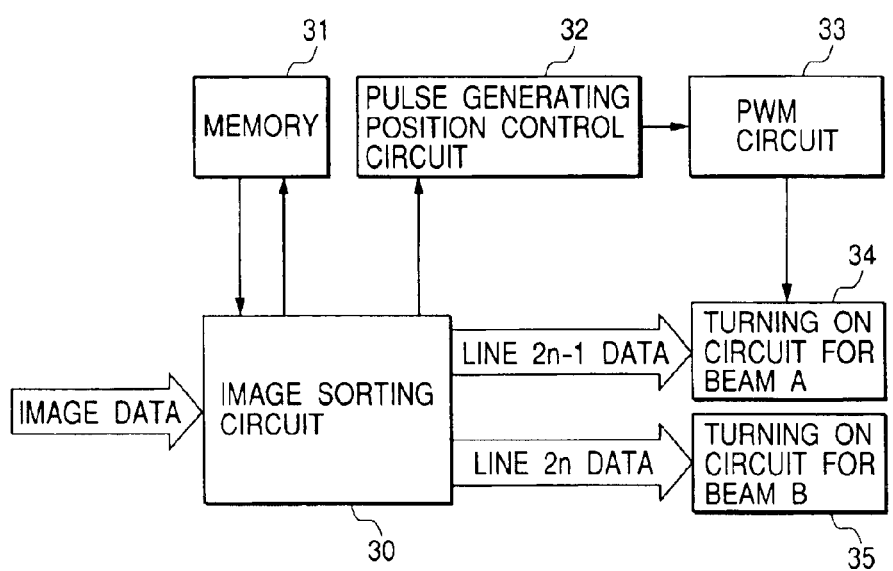
FIG. 3 is a circuit diagram showing one example of a pulse width control circuit for the semiconductor laser according to the embodiment.

FIG. 3 is a circuit diagram showing one example of a pulse width control circuit for the semiconductor laser. The pulse width control circuit has an image sorting circuit 30 for sorting image data into an odd line and an even line, a memory 31 for storing turning on positions, a pulse generating position control circuit 32 for generating a pulse generating position signal, a PWM circuit 33 for generating a triangular wave in accordance with the pulse generating position signal, a beam-A-circuit 34 for controlling the beam "A" from the semiconductor laser 21, and a beam-B-circuit 35 for controlling the beam "B" from the semiconductor laser 21.

In the embodiment constructed as above, the image sorting circuit 30 determines image data in that adjacent main scanning data are present and two beams are separately turned ON. First, the image sorting circuit 30 sorts two main scanning data into an odd line of the beam "A" and an even line of the beam "B". When data is present in only the beam "B", a turning on position of the beam "B" is stored in the memory 31. At next scanning, when the turning on position of the beam "A" corresponds to the stored turning on position of the beam "B", the image sorting circuit 30 controls the pulse generating position control circuit 32. Then, the pulse generating position control circuit 32 outputs the pulse generating position signal to the PWM circuit 33. The PWM circuit 33 generates a triangular wave synchronous with a standard clock in accordance with the pulse generating position signal and outputs the triangular wave to the beam-A-circuit. The beam-A-circuit 34 modulates the image data of the beam "A" and shortens a turning on time so as to decrease a half tone density.

Figure 4:
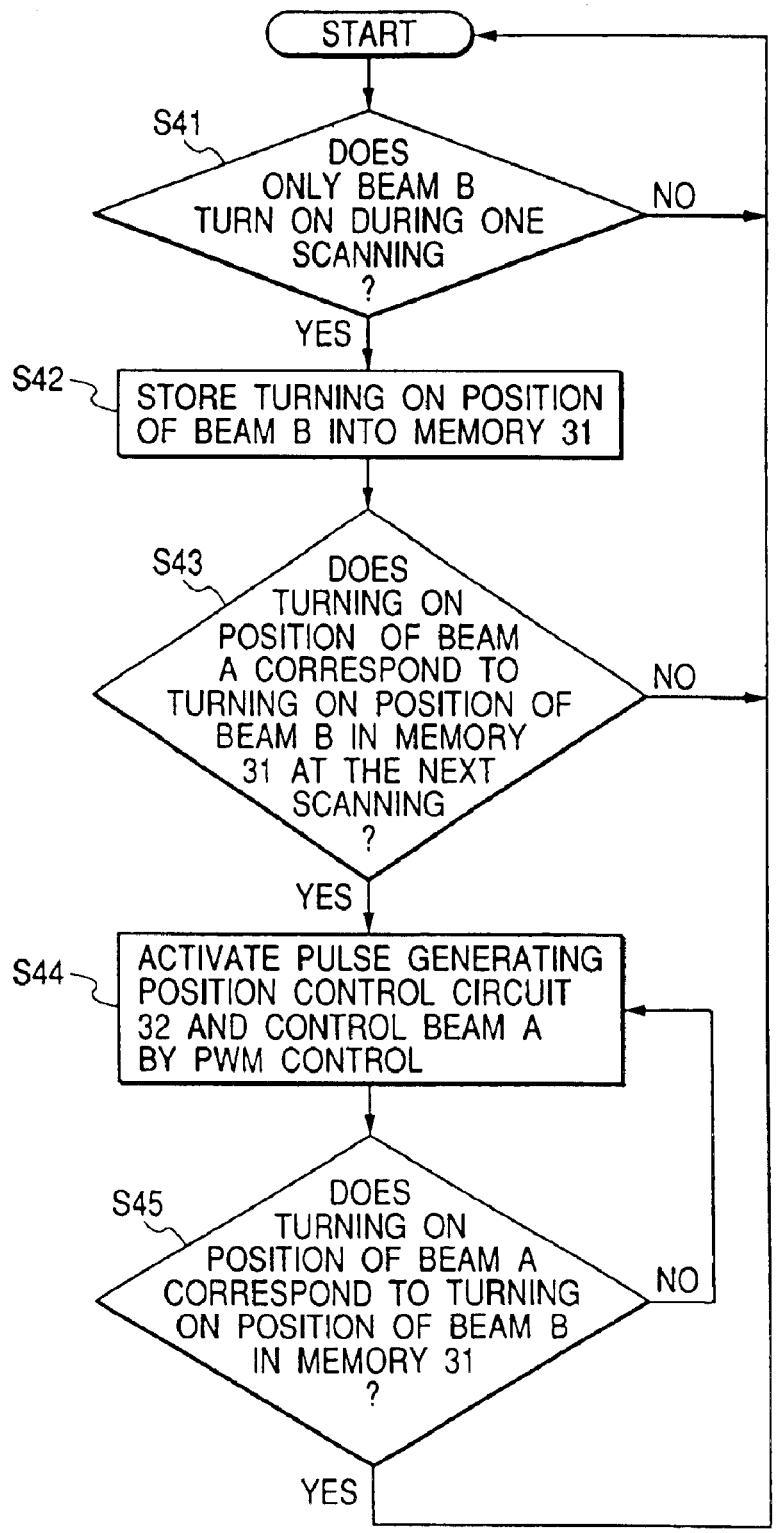
FIG. 4 is a flow chart showing one example of a method of sorting the image data by the image sorting circuit according to the embodiment.

FIG. 4 is a flow chart showing one example of a method of sorting the image data by the image sorting circuit. Two main scanning data are sorted into the odd line of the beam "A" and the even line of the beam "B". In adjacent lines 2n−1 and 2n (n=1, 2, 3, . . . ), the case where data is present in only the line 2n (the data indicates block color) is determined (Step S41). When Yes in Step S41, the turning on position during the main scanning is stored in the memory 31 in which the turning on position of the beam "B" is stored (Step S42). On the other hand, when No in Step S41, the processing is returned to the START, and the next image data is awaited. When Yes in the Step S41 and then Step S42 is performed, it is checked whether or not the turning on position of the beam "A" related to a next line 2n+1 corresponds to the stored position of the beam "B" (Step S43). When the turning on position of the beam "A" corresponds to the stored position of the beam "B", the image sorting circuit 30 activates the pulse generating position control circuit 32 (Step S44). Then, as long as the turning on position of the beam "A" corresponds to the stored position of the beam "B", the same process is repeated (Step S45).

FIG. 5 shows a state that the turning on time is shortened so as to modulate the image data of the beam "A", and thus decrease the half tone density in the beam-A-circuit. The memory 31 in the image sorting circuit 30 stores a data position of the beam "B" along the main scanning, immediately before the beam "A" to which the pulse width modulation is applied. When this position data corresponds to the next image data of the beam "B" in the main scanning direction, the pulse generating position signal is outputted from the image sorting circuit 30 to the PWM circuit 33 through the pulse generating position control circuit 32. The PWM circuit 33 generates the triangular wave synchronous with the standard clock in accordance with the pulse generating position signal. When this position data does not correspond to the next image data of the beam "B" in the main scanning direction, the pulse generating position signal is not outputted.

Figure 6A:
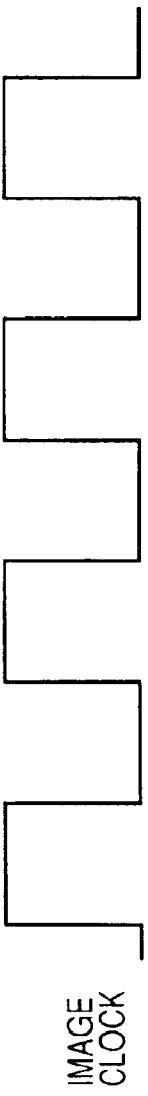
FIGS. 6A, 6B, 6C and 6D show one example of a time chart in the case where the beam-A-circuit is controlled by a PWM circuit, according to the embodiment.
Figure 6B:
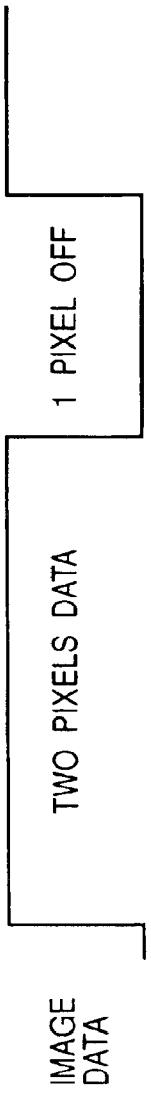
Figure 6C:
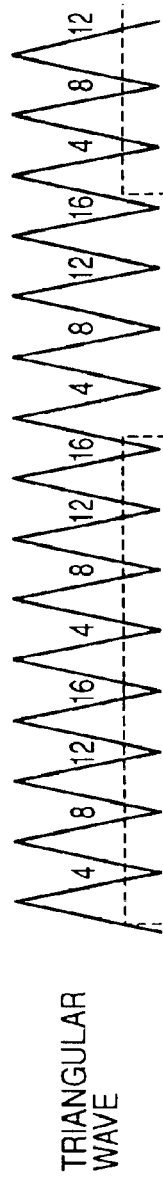
Figure 6D:
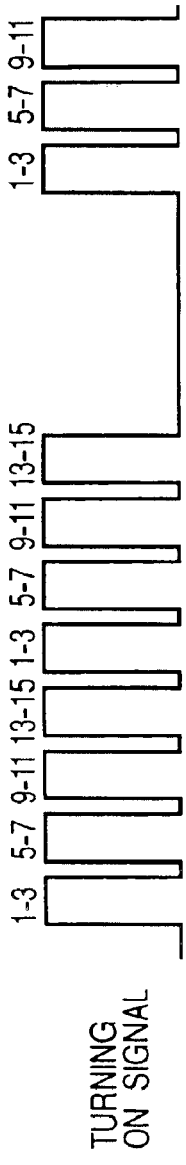

FIGS. 6A to 6D show one example of a time chart in the case where the beam-A-circuit is controlled by the PWM circuit. An image clock as a standard in FIG. 6A, the image data of the beam "A" in FIG. 6B, and the triangular wave from the PWM circuit 33, on which the image data (the same data as data in FIG. 6B) indicated by a dashed line is superimposed in FIG. 6C, are respectively shown. Also, a turning on signal from the beam-A-circuit 34, which is modulated based on the triangular wave in FIG. 6C is shown in FIG. 6D. The image data in FIG. 6B and the triangular wave in FIG. 6C are synchronized with each other, and thus the turning on signal which is pulse-width-modulated based on the image data is obtained. As one example, with respect to the image data in FIG. 6B, 2 pixels are set to be ON and 1 pixel is set to be OFF in the main scanning direction. With respect to the turning on signal, when an image clock period corresponding to 1 pixel is divided into 16 periods, the 4th, 8th, 12th, and 16th positions from the head are skipped. Therefore, the turning on is made in the remaining positions, that is, first to third, 5th to 7th, 9th to 11th, and 13th to 15th positions.

FIGS. 7A to 7C show one example of a time chart in the case where the beam-A-circuit is not controlled by the PWM circuit. The image clock as the standard in FIG. 7A, the image data of the beam "A" in FIG. 7B, and a turning on signal from the beam-A-circuit 34 based on the image data which is not pulse-width-modulated in FIG. 7C, are respectively shown.

The comparison between FIGS. 6A to 6D and 7A to 7C will be described. When the pulse-width-modulated turning on signal in FIG. 6D which is the output of the beam-A-circuit 34 is compared with the turning on signal in FIG. 7C which is the not pulse-width-modulated output of the beam-A-circuit 34, the turning on time in FIG. 6D is decreased to $12/16$ (=$3/4$) of the turning on time in FIG. 7C. Thus, when the pulse width modulation is applied, a total turning on time of the beam "A" is shortened to $3/4$. Note that, since skipping is made in an extremely short period and time, after exposure, a developed horizontal line does not become a wavy line.

Figure 8:
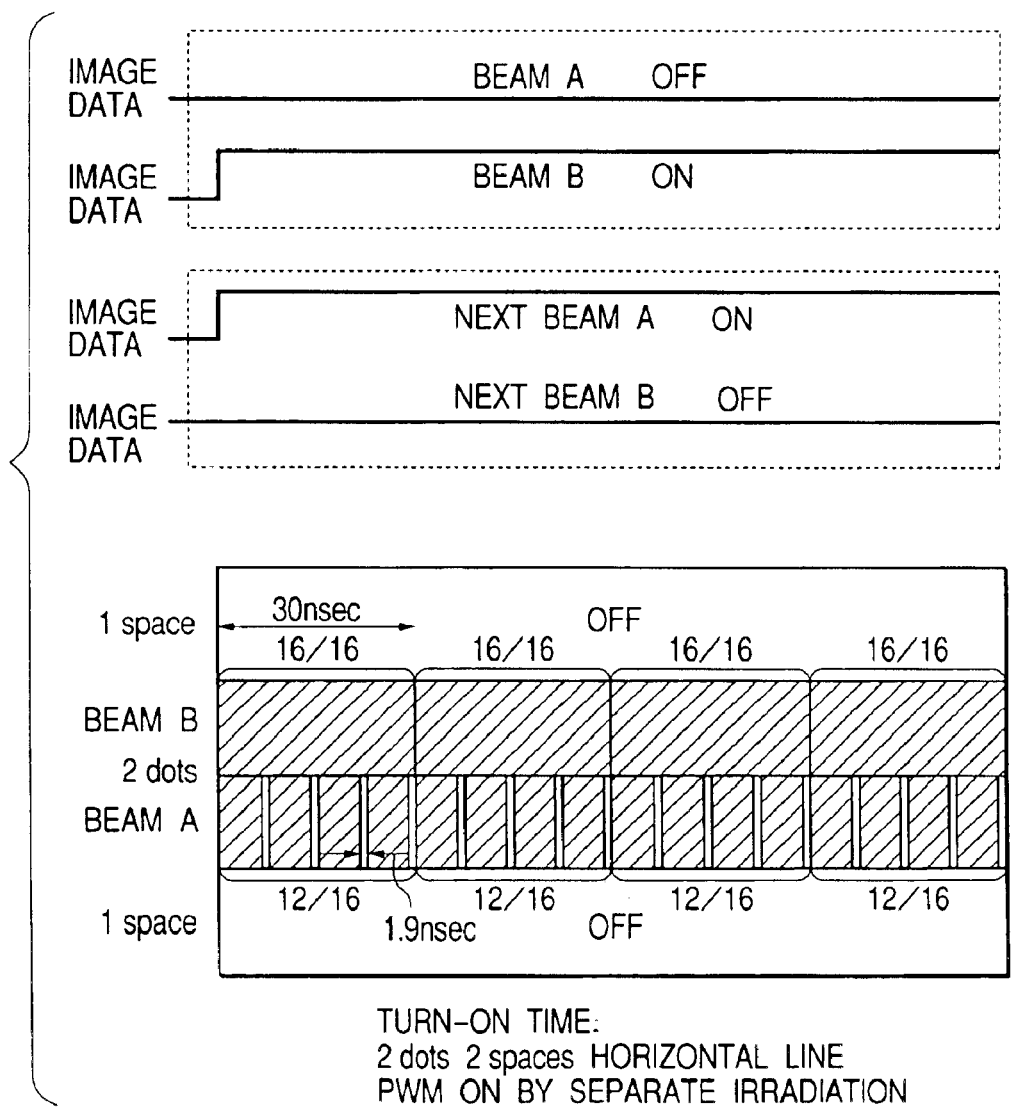
FIG. 8 is a schematic view indicating the turning on time in the case of 2 dots and 2 spaces in that the beams "A" and "B" are separately irradiated in the embodiment.
Figure 23:
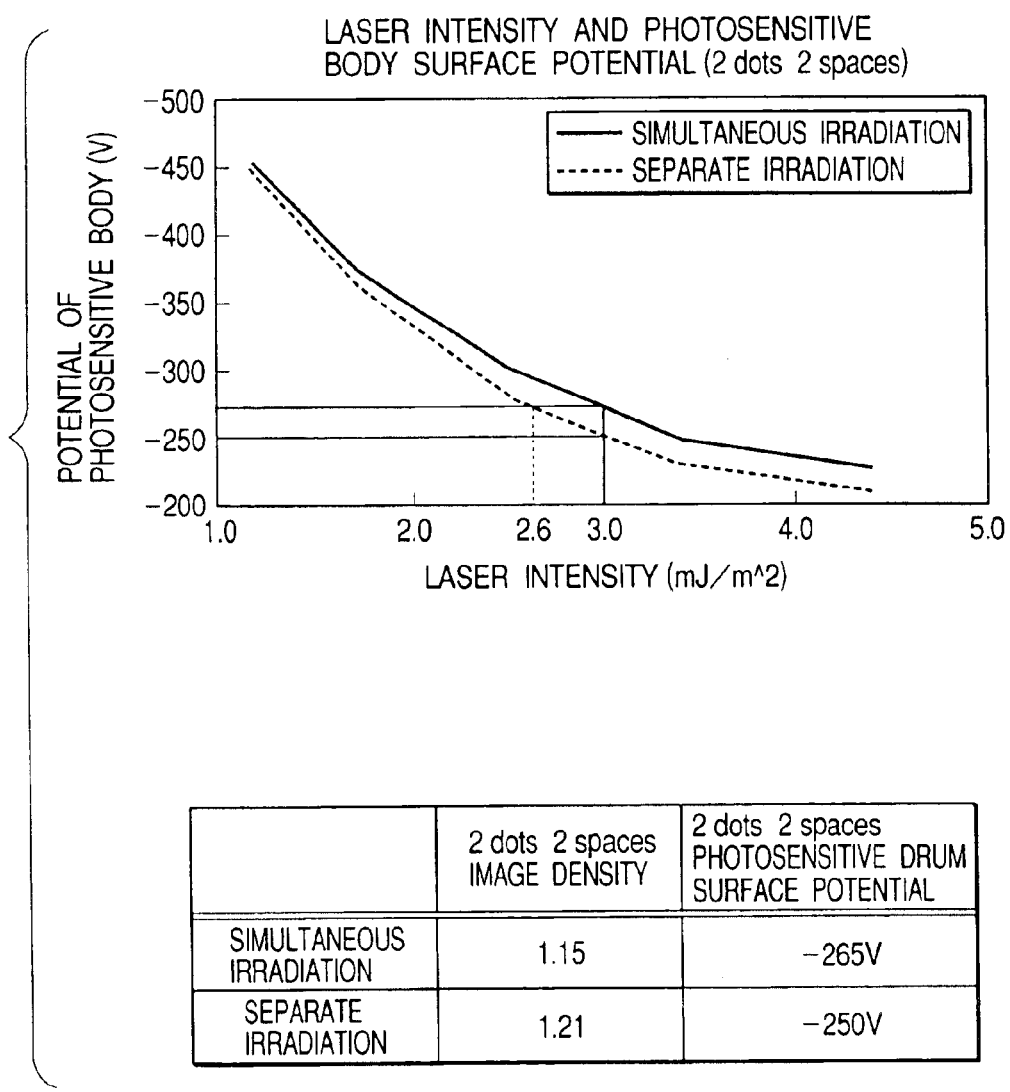
FIG. 23 shows results obtained by measuring the surface potential of the photosensitive body by changing the light intensity in the cases of 2 dots and 2 spaces by the simultaneous irradiation and the separate irradiation using the beams "A" and "B" in the multi-beam of the conventional example.

FIG. 8 is a schematic view showing the turning on time in the case of 2 dots and 2 spaces in that the beams "A" and "B" are separately irradiated in respective main scannings which are different from each other. The PWM circuit 33 is operated when there are the main scanning lines of 2 dots or more, in two pairs of scanning lines and the beam "B" in the preceding pair is adjacent to the beam "A" in the succeeding pair. In this case, the beam "B" is fully turned on for the turning on time of $16/16$ in all positions of the horizontal line located above. On the other hand, the beam "A" in the horizontal line located below is turned on for the turning on time of $12/16$, which is shortened. Thus, when the turning on time of the beam "A" and that of the beam "B" are summed, the half tone of 2 dots and 2 spaces in the case where the total turning on time is decreased to $7/8$ is obtained. This is calculated based on FIG. 23. When the density in the separate irradiation is adjusted to that in the simultaneous irradiation, the light intensity may be decreased from 3.0 to 2.6 mJ/m$^2$. Thus, the light intensity in the separate irradiation becomes about $7/8$ of the light intensity in the simultaneous irradiation.

Figure 9:
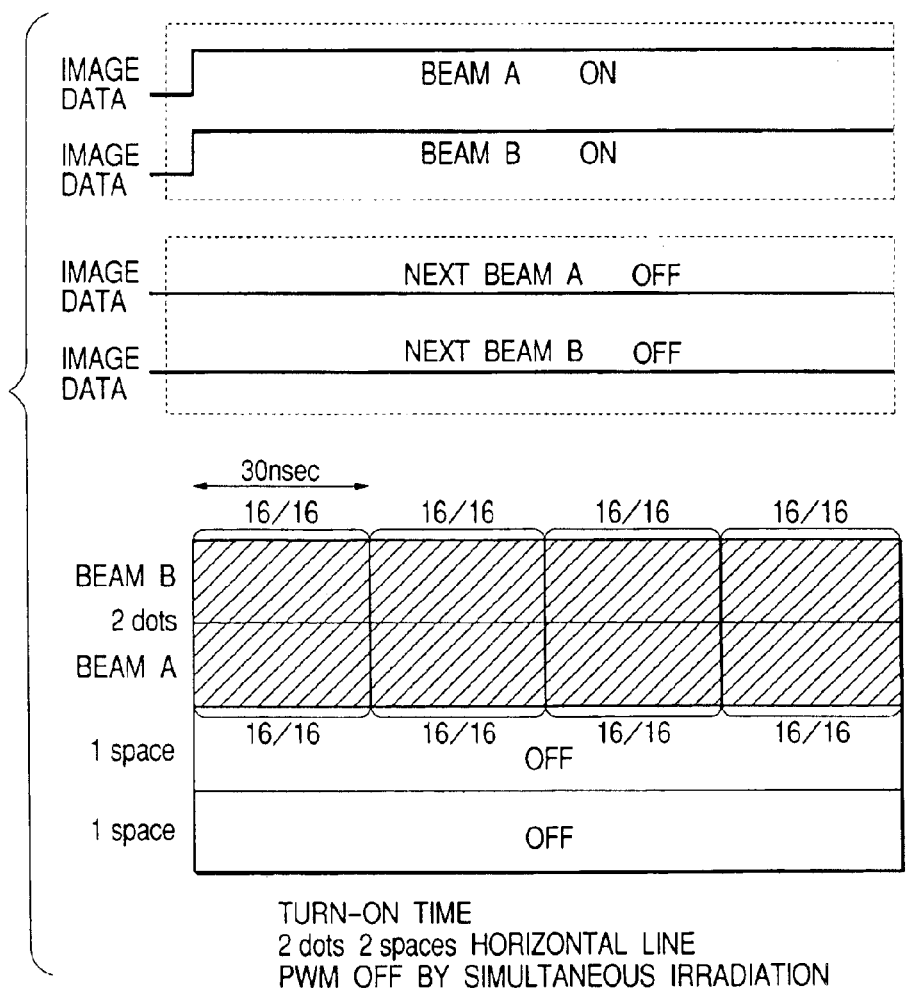
FIG. 9 is a schematic view indicating the turning on time in the case of 2 dots and 2 spaces in that the beams "A" and "B" are simultaneously irradiated in the embodiment.

FIG. 9 is a schematic view showing the turning on time in the case of 2 dots and 2 spaces in that the beams "A" and "B" are simultaneously irradiated in the same main scanning. The respective beams "A" and "B" are fully turned on for the turning on time of $16/16$ in all positions of the horizontal line.

Figure 10:
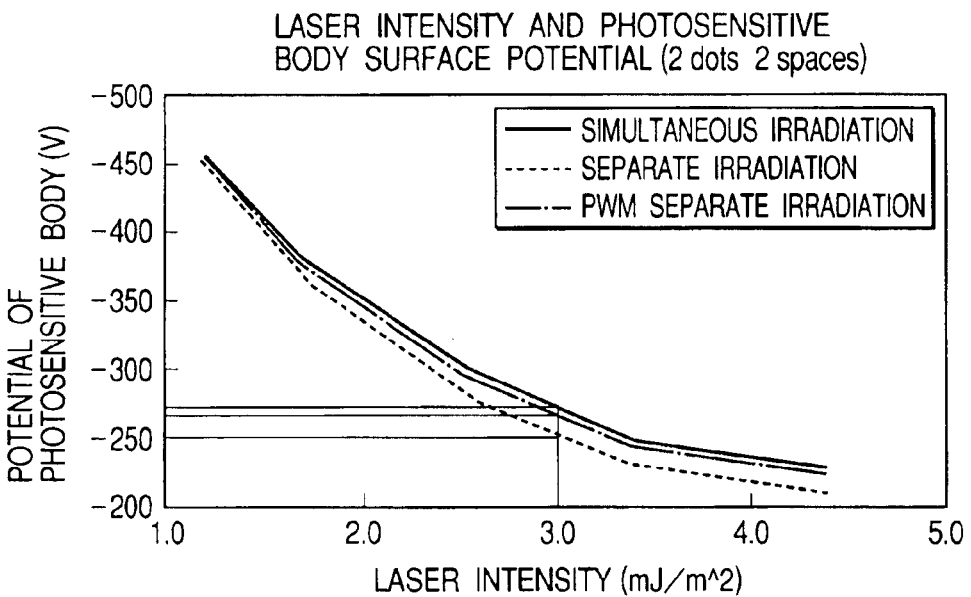
FIG. 10 shows results obtained by measuring a surface potential of the photosensitive body by changing the light intensity in the cases of 2 dots and 2 spaces by the simultaneous irradiation and the separate irradiation using the beams "A" and "B" in the embodiment.

FIG. 10 shows results obtained by measuring a surface potential of the photosensitive body by changing the light intensity in the cases of 2 dots and 2 spaces by the simultaneous irradiation and the separate irradiation using the beams "A" and "B". In order to ascertain an effect due to shortening of the turning on time in the separate turning on, the surface potential of the photosensitive body is measured by changing the light intensity. Here, the density of the half tone image obtained by repeating 2 dots and 2 spaces in the number of pixels of 1200 dpi and the latent image potential on the drum are measured. As the conditions, the case of 2 dots and 2 spaces by the simultaneous irradiation using the beams "A" and "B" and the case of 2 dots and 2 spaces by the separate irradiation in that a second beam is pulse-width-modulated. As can be seen from this graph, a potential curve corresponding to the light intensity in 2 dots and 2 spaces by the simultaneous irradiation almost matches that in 2 dots and 2 spaces with the pulse width modulation. The density in the case of 2 dots and 2 spaces by the simultaneous irradiation was 1.15. Also, the density in the case of 2 dots and 2 spaces by the separate irradiation in that the second beam is pulse-width-modulated was 1.15. Thus, these densities in both cases agree with each other due to the effect by the pulse width modulation.

As described above, in the case of the multi-beam, when the case of the simultaneous exposure using two beams is compared with the case of the separate exposure using two beams, in the simultaneous exposure, the potential becomes higher and the sensitivity is deteriorated relative to the separate exposure. However, the turning on time in the case the separate exposure is shortened by using the pulse width modulation, and thus the potential can be adjusted. Since the development with the toner is made after the adjustment of the potential, the density can be uniformed.

Also, the influence on the image by the pulse width modulation, such as a defect, is not produced. In the case of 1200 dpi, a size of 1 pixel is 21 μm, "30 nsec" shown in FIGS. 8 and 9 corresponds to 21 μm. Here, since the image clock period is divided into 16 periods and then skipping is made, 1.9 nsec corresponds to 1.3 µm. A spot size in the main scanning direction is 70 µm and thus 1.3 µm is sufficiently small. Therefore, a defect image is not produced by overlapping of the latent images. Actually, when the development with the toner having a particle size of 7 µm is made, an image in that a lower half portion of the horizontal lines is defected is not produced.

(Embodiment 2)

In this embodiment, generally, the turning on time is shortened always by the pulse width modulation, and when two semiconductor lasers are simultaneously turned on, the full turning on is made. According to this structure, even if an immediately preceding beam position is not stored, the potential can be made uniform. Note that, in Embodiment 2, the same parts as in Embodiment 1 are referred to as the same reference numerals.

Figure 11:
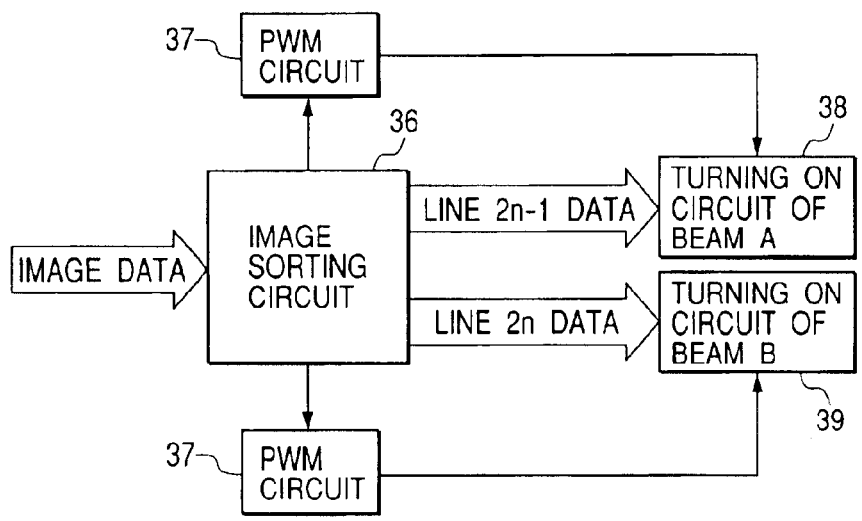
FIG. 11 is a circuit diagram showing one example of a pulse width control circuit of the semiconductor lasers according to the embodiment.

FIG. 11 is a circuit diagram showing one example of a pulse width control circuit for the semiconductor laser. The pulse width control circuit has an image sorting circuit 36 for sorting image data into odd lines and even lines, PWM circuits 37 for generating triangular waves in accordance with a signal from the image sorting circuit 36, a beam-A-circuit 38 for controlling the beam "A" from the semiconductor laser, and a beam-B-circuit 39 for controlling the beam "B" from the semiconductor laser.

In the embodiment constructed in this way, the image sorting circuit 36 first sorts two main scanning data into an odd line of the beam "A" and an even line of the beam "B". With respect to the beams "A" and "b" to be scanned in pairs, when the beam "A" is turned ON and beam "B" is turned OFF or when the beam "A" is turned OFF and beam "B" is turned ON, the image sorting circuit 36 outputs a signal to one of the PWM circuits 37. The PWM circuit 37 which receives the signal generates a triangular wave synchronous with a standard clock in accordance with the signal and outputs the triangular wave to the beam-A-circuit 38 or the beam-B-circuit 39. The beam-A-circuit 38 and the beam-B-circuit 39 modulate the image data of the beams "A" and "B" and shortens the turning on time so as to decrease the half tone density.

Figure 12:
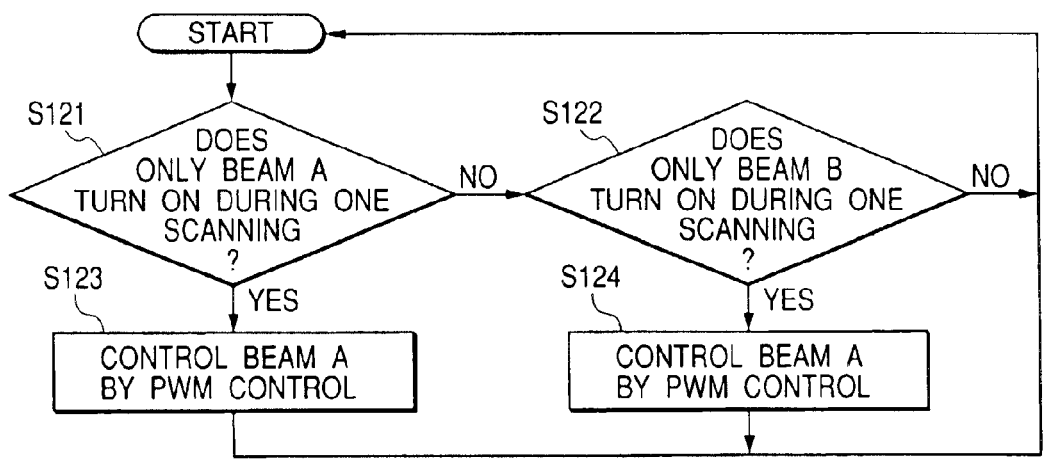
FIG. 12 is a flow chart showing one example of a method of sorting the image data by the image sorting circuit according to the embodiment.

FIG. 12 is a flow chart showing one example of a method of sorting the image data by the image sorting circuit according to the present invention. Two main scanning data are sorted into the odd line of the beam "A" and the even line of the beam "B". In adjacent lines 2n−1 and 2n (n=1, 2, 3, . . . ), the case where data is present in only the line 2n−1 is determined (Step S121). Also, the case where data is present in only the line 2n is determined (Step S122). When Yes in Step S121 or Step S122, the image sorting circuit 36 activates the PWM circuit(s) 37 (Step S123 or Step S124). On the other hand, when No in Step S121 and Step S122, the process returns to the START, and the next image data is awaited.

Figure 13A:
FIGS. 13A, 13B, 13C, 13D, 13E, 13F and 13G show one example of a time chart in the case where the control by the PWM circuits is performed in the embodiment.
Figure 13B:
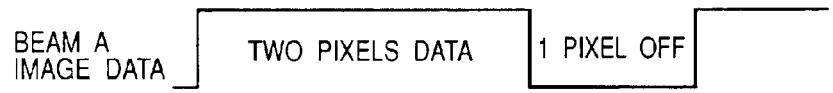
Figure 13C:
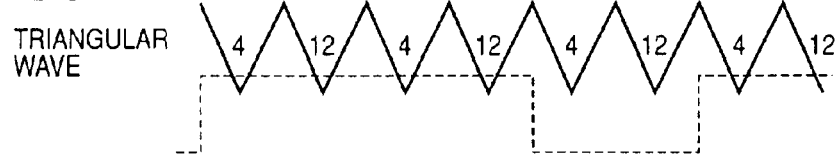

FIGS. 13A to 13G show one example of a time chart in the case where the beam-A-circuit and the beam-B-circuit are controlled by the PWM circuits. An image clock as a standard in FIG. 13A, the image data of the beam "A" in FIG. 13B, and the triangular wave from the PWM circuit 37 in FIG. 13C, on which the image data (the same data as data in FIG. 13B) indicated by a dashed line is superimposed are respectively shown. Also, a turning on signal from the beam-A-circuit 38 in FIG. 13D, which is modulated based on the triangular wave in FIG. 13C is shown. Further, the image data of the beam "B" in FIG. 13E and the triangular wave from the PWM circuit 37 in FIG. 13F, on which the image data (the same data as data in FIG. 13E) indicated by a dashed line is superimposed are respectively shown.

Figure 13D:
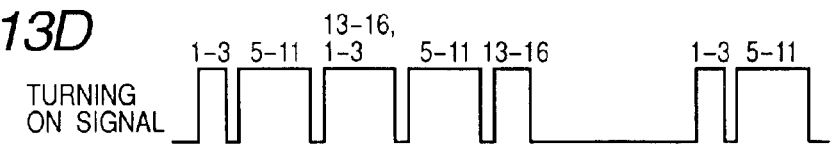
Figure 13E:
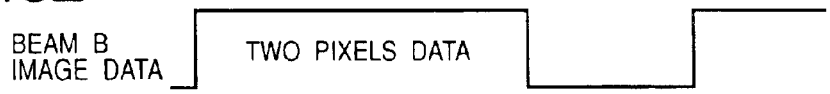
Figure 13F:
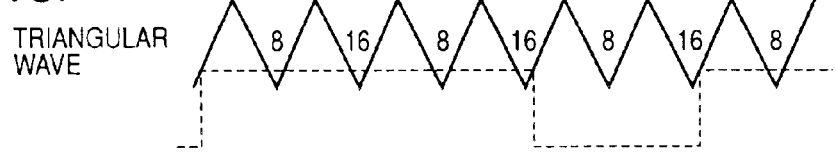
Figure 13G:
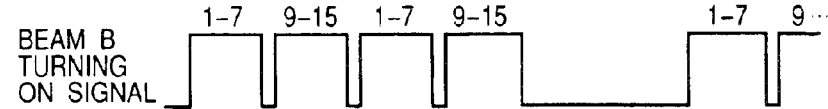

Furthermore, a turning on signal from the beam-B-circuit 39 in FIG. 13G, which is modulated based on the triangular wave in FIG. 13F is shown. The image data in FIG. 13B and FIG. 13E and the triangular waves in FIG. 13C and FIG. 13F are synchronized with each other, and thus the turning on signals which are pulse-width-modulated based on the image data are obtained. As one example, with respect to the image data in FIG. 13B and FIG. 13E, 2 pixels are set to be ON and 1 pixel is set to be OFF in the main scanning direction. The turning on signal in FIG. 13D or FIG. 13G from the PWM circuits 37 is operated in the case of only the beam "A" turning on or only the beam "B" turning on in one scanning. Here, with respect to 2 dot lines, in order to adjust the light intensity to be decreased to match that in Embodiment 1, the period of the triangular waves in FIG. 13C and FIG. 13F is set to be two times as long as that in Embodiment 1. With respect to the turning on signal, when an image clock period corresponding to 1 pixel is divided into 16 periods, 4th and 12th positions from the head are skipped in the beam "A". Therefore, the turning on is made in the remaining positions, that is, 1st to 3rd, 5th to 11th, 13th to 16th positions. On the other hand, 8th and 16th positions from the head are skipped in the beam "B". Therefore, the turning on is made in the remaining positions, that is, 1st to 7th and 9th to 15th positions.

With respect to the signal of the beam "A", when the turning on signal in FIG. 13D which is pulse-width-modulated is compared with that in the full turning on, the turning on time in FIG. 13D is decreased to $^{14}/_{16}$ (=$^{7}/_{8}$). Thus, when the pulse width modulation is applied, a total turning on time of the beam "A" is shortened to $^{7}/_{8}$. Also, with respect to the signal of the beam "B", when the turning on signal in FIG. 13G which is pulse-width-modulated is compared with that in the full turning on, the turning on time in FIG. 13G is decreased to $^{14}/_{16}$ (=$^{7}/_{8}$). Thus, when the pulse width modulation is applied, a total turning on time of the beam "b" is shortened to $^{7}/_{8}$. Note that, since skipping is made in an extremely short period and time, after exposure, a developed horizontal line does not become a wavy line.

Figure 14:
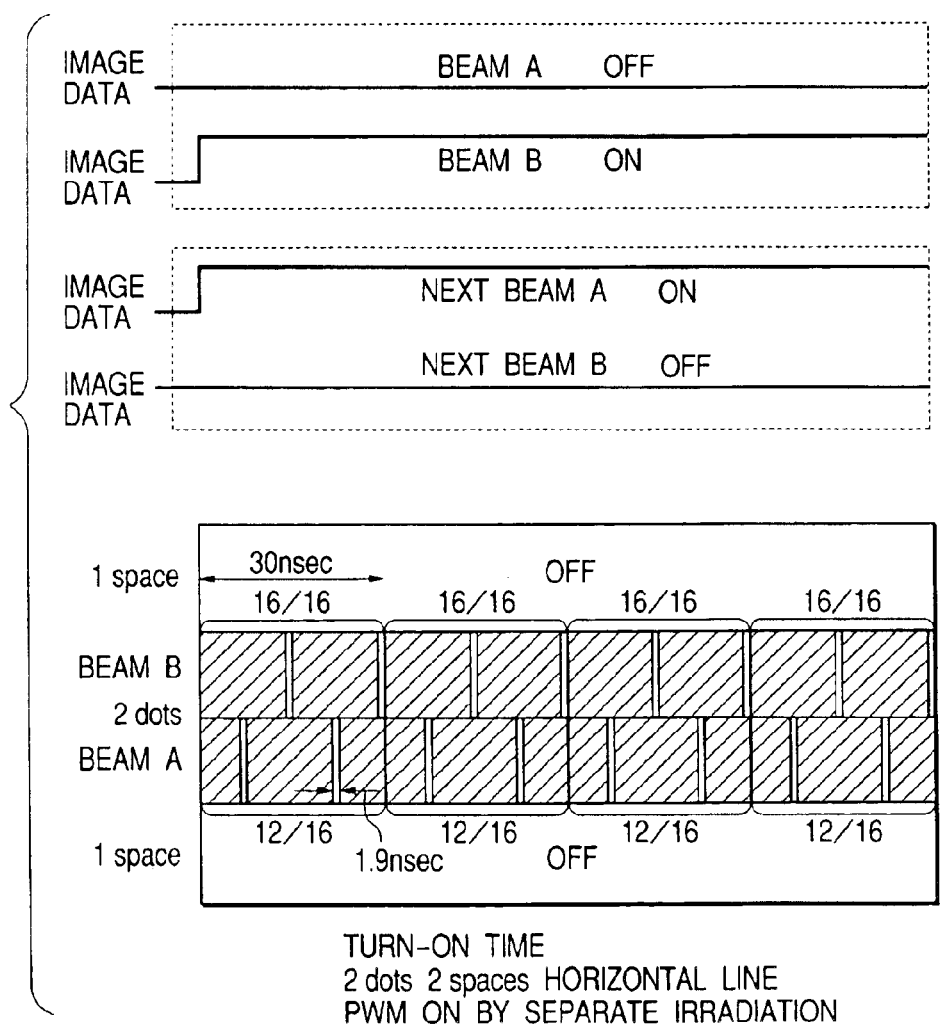
FIG. 14 is a schematic view showing the turning on time in the case of 2 dots and 2 spaces in that the beams "A" and "B" are separately irradiated in the embodiment.

FIG. 14 is a schematic view showing the turning on time in the case of 2 dots and 2 spaces where the beams "A" and "B" are separately irradiated. When two beams are separately turned on and in the horizontal lines of 2 dots and 2 spaces, the beam "B" in the preceding pair is adjacent to the beam "A" in the succeeding pair, the PWM circuits 37 are operated. In this case, the beam "B" is turned on for the turning on time of $^{14}/_{16}$, which is shortened, in the horizontal line located above. Also, the beam "A" is turned on for the turning on time of $^{14}/_{16}$ in the horizontal line located below. Thus, when the turning on time of the beam "A" and that of the beam "B" are summed, the 2 dot lines in the case where the total turning on time of the lasers is decreased to $^{7}/_{8}$ is obtained.

Figure 15:
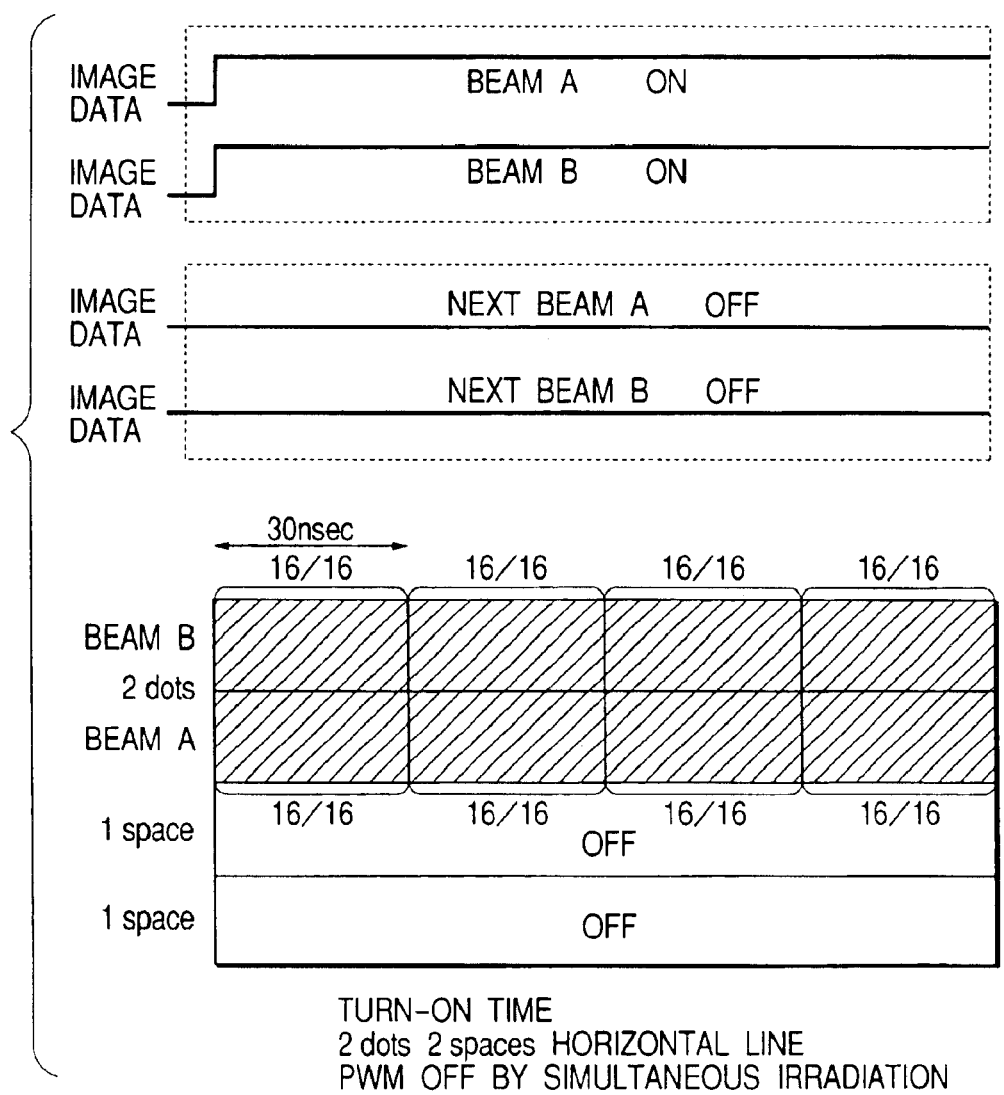
FIG. 15 is a schematic view showing the turning on time in the case of 2 dots and 2 spaces in that the beams "A" and "B" are simultaneously irradiated in the embodiment.
Figure 16:
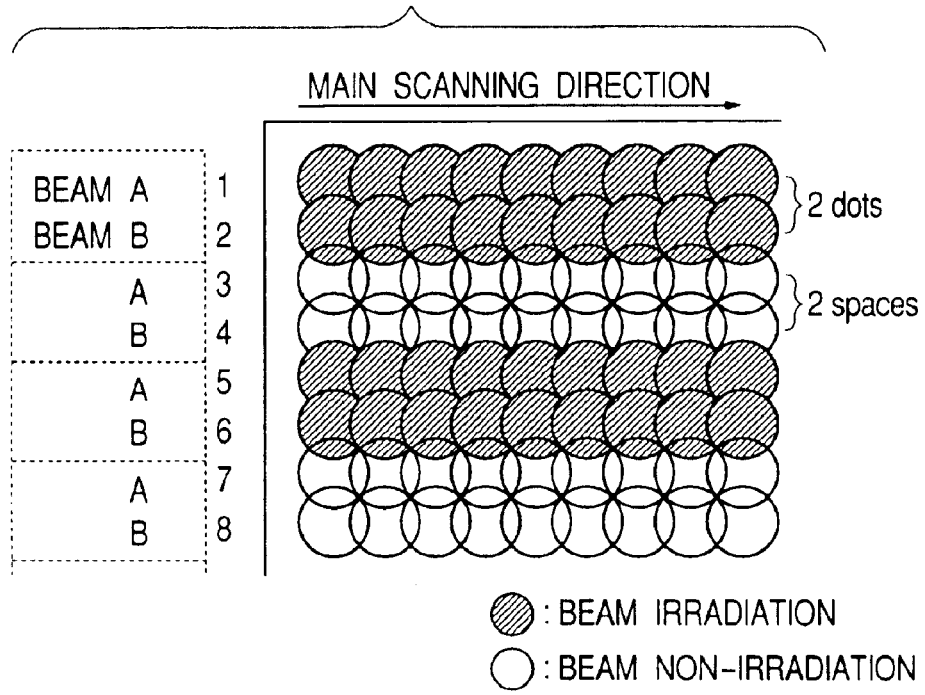
FIG. 16 is a schematic view showing a half tone of 2 dots and 2 spaces in the case where beams "A" and "B" are simultaneously irradiated in a conventional example.
Figure 17:
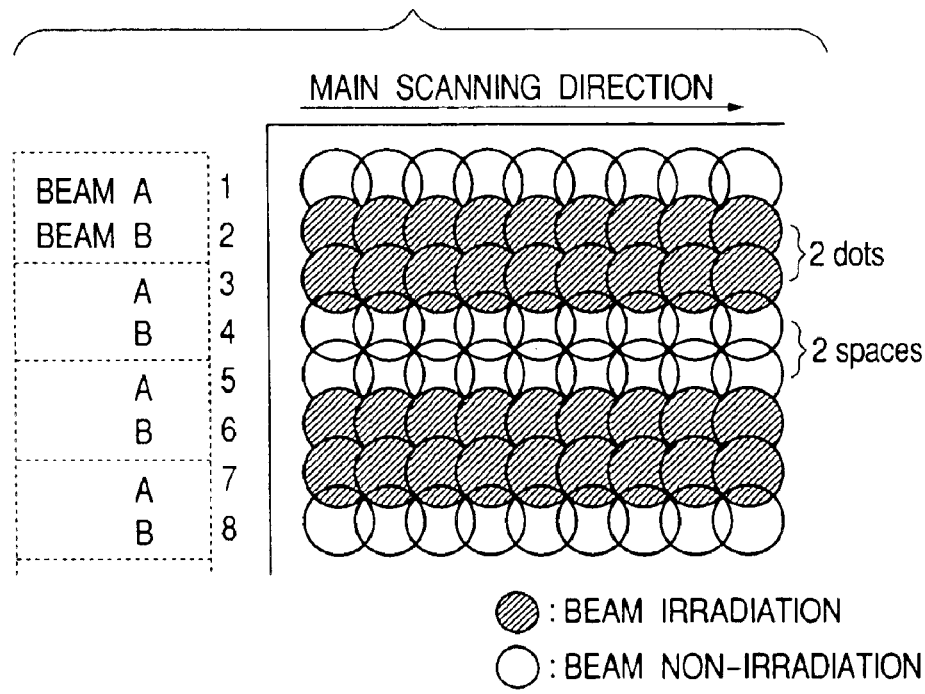
FIG. 17 is a schematic view showing the half tone of 2 dots and 2 spaces in the case where the beams "A" and "B" are alternately irradiated in the conventional example.
Figure 18:
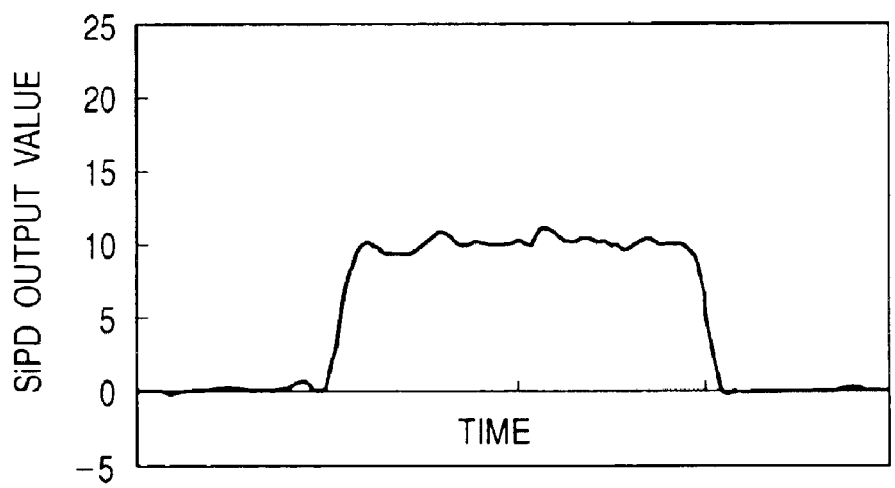
FIG. 18 shows a measurement value of the light intensity by a pin photo diode in the case where the beam "A" is scanned with a single shot in the conventional example.
Figure 19:
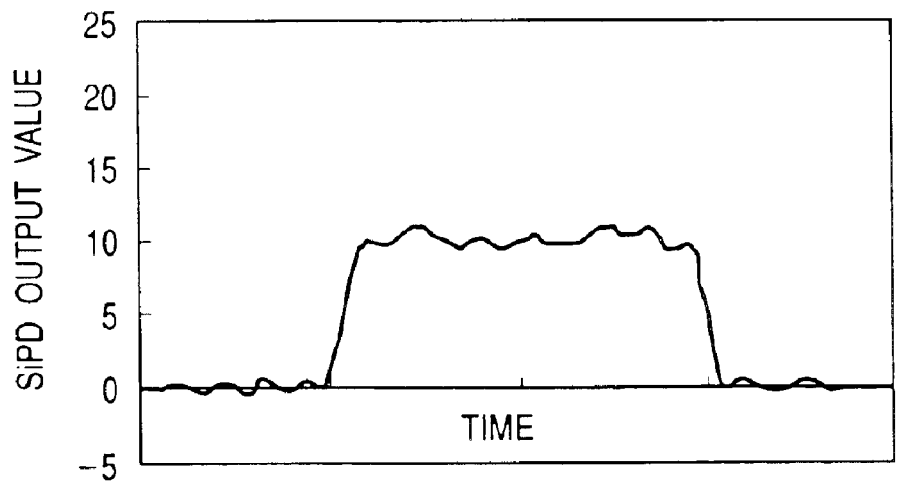
FIG. 19 shows the measurement value of the light intensity by the pin photo diode in the case where the beam "B" is scanned with the single shot in the conventional example.
Figure 20:
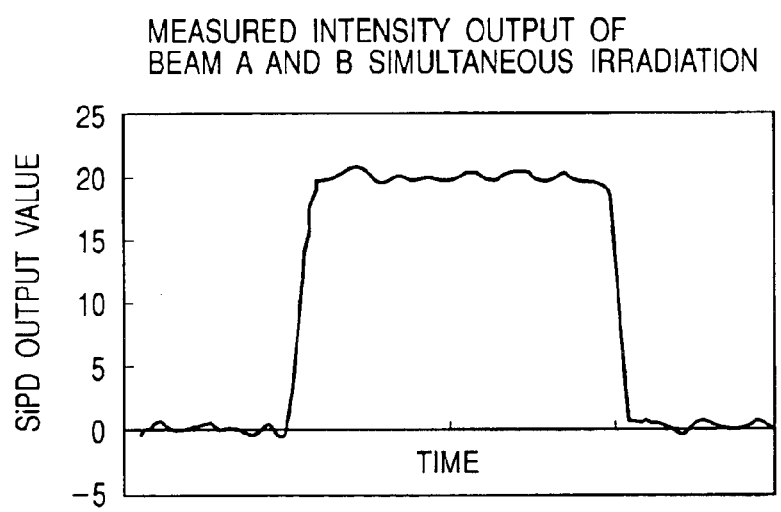
FIG. 20 shows the measurement value of the light intensity by the pin photo diode in the case where the beams "A" and "B" are simultaneously turned on and scanned in the conventional example.
Figure 21:
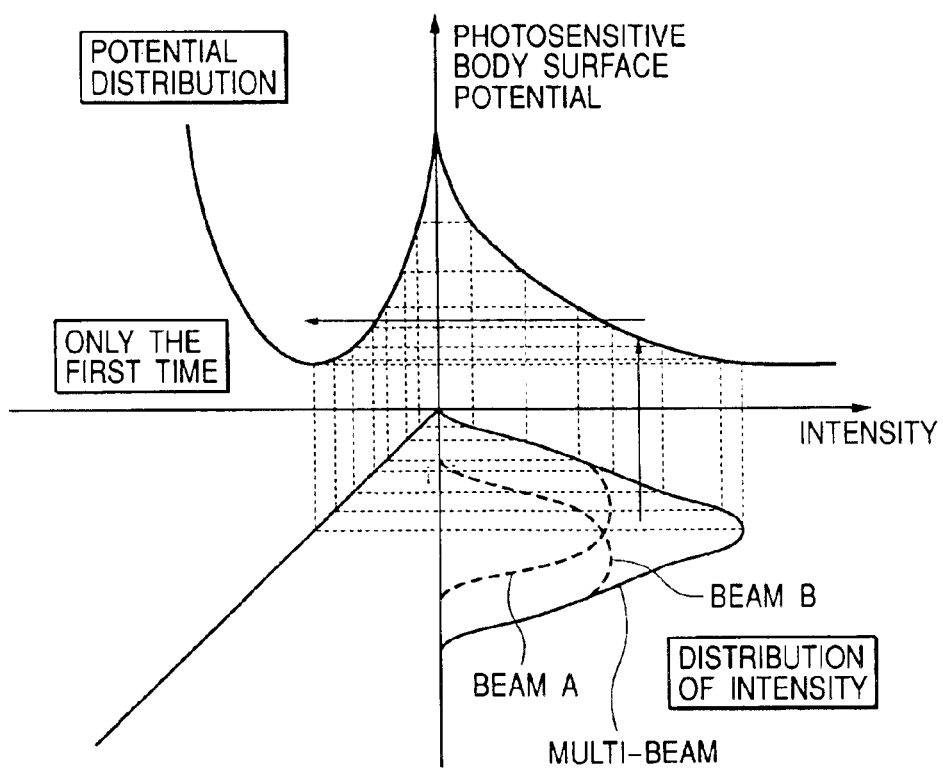
FIG. 21 is a concept view in the case where a light intensity distribution at simultaneous exposure is converted into a potential distribution through an E–V curve in the conventional example.
Figure 22:
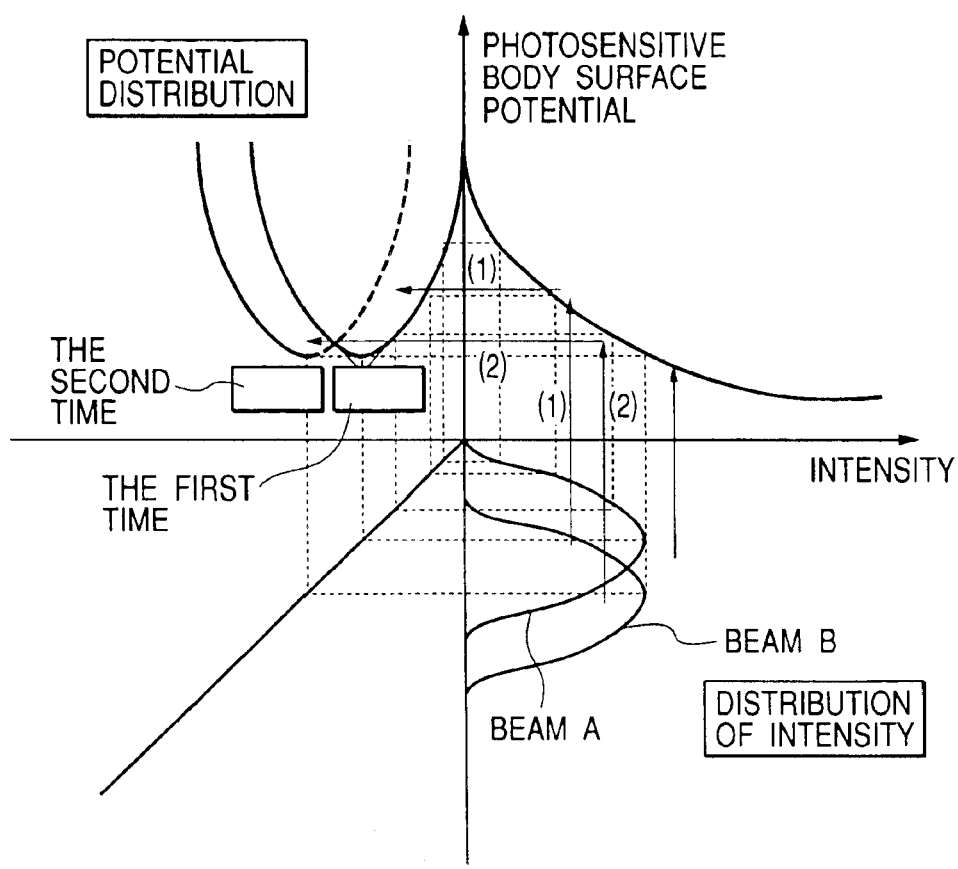
FIG. 22 is the concept view in the case where the light intensity distribution at separate exposure is converted into the potential distribution through the E–V curve in the conventional example.

FIG. 15 is a schematic view showing the turning on time in the case of 2 dots and 2 spaces in that the beams "A" and "B" are simultaneously irradiated. The respective beams "A" and "B" are fully turned on for the turning on time of $^{16}/_{16}$ in the horizontal lines. In comparison between FIG. 14 and FIG. 15, the same effect as in Embodiment 1 as shown in FIGS. 8 to 10 is obtained. That is, due to the effect by the pulse width modulation, in both cases, the surface potentials of the photosensitive body are substantially equal to each other and the densities also agree with each other.

In Embodiments 1 and 2 described above, an example of the half tone of 2 dots and 2 spaces is described. According to the present invention, a method of changing the PWM control in the simultaneous exposure and the separate exposure of the multi-laser is proposed. However, the present invention is not limited to the case of 2 dots. An example of another half tone is shown in Table 1.

TABLE 1

| | | | Embodiment 1 | | Embodiment 2 | |
|---|---|---|---|---|---|---|
| | | | beam A | beam B | beam A | beam B |
| 1 dot | Example 1 | separate | full turn on | OFF | PMW turn on weak | OFF |
| | Example 2 | separate | OFF | full turn on | OFF | PMW turn on weak |
| 2 dot | Example 1 | simultaneous | full turn on | full turn on | full turn on | full turn on |
| | Example 2 | separate 1 | OFF | full turn on | OFF | PMW turn on weak |
| | | separate 2 | PMW turn on | OFF | PMW turn on weak | OFF |
| 3 dot | Example 1 | simultaneous 1 | full turn on | full turn on | full turn on | full turn on |
| | | separate 2 | PMW turn on | OFF | PMW turn on weak | OFF |
| | Example 2 | separate 1 | OFF | full turn on | OFF | PMW turn on weak |
| | | simultaneous 2 | PMW turn on | full turn on | full turn on | full turn on |
| 4 dot | Example 1 | simultaneous 1 | full turn on | full turn on | full turn on | full turn on |
| | | simultaneous 2 | full turn on | full turn on | full turn on | full turn on |
| | Example 2 | separate 1 | OFF | full turn on | OFF | PMW turn on weak |
| | | simultaneous 2 | PMW turn on | full turn on | full turn on | full turn on |
| | | simultaneous 3 | PMW turn on | OFF | PMW turn on weak | OFF |
| 5 dot | Example 1 | simultaneous 1 | full turn on | full turn on | full turn on | full turn on |
| | | simultaneous 2 | PMW turn on | full turn on | full turn on | full turn on |
| | | separate 3 | PMW turn on | OFF | PMW turn on weak | OFF |
| | Example 2 | separate 1 | OFF | full turn on | OFF | PMW turn on weak |
| | | simultaneous 2 | PMW turn on | full turn on | full turn on | full turn on |
| | | simultaneous 3 | PMW turn on | full turn on | full turn on | full turn on |

In the multi-laser using two beams, there is the case where a write position of the half tone is shifted. Thus, there are two types of halftones depending on different write positions. Example 1 indicates the case where an image is started for writing by the beam "A". Example 2 indicates the case where the beam "A" is turned OFF and thus an image is started for writing by the beam "B". In the case of 1 dot, only the beam "A" is fully turned on or only the beam "B" is fully tuned on. Thus, the equivalent potentials are obtained.

In Embodiment 1, according to the flow chart shown in FIG. 4, when only the beam "B" is turned on in two pairs of scannings, the beam "A" in the next scanning is PWM-turned on. In table 1, for example, in the case of Example 2 of 2 dots, the turning on order of the beam sequentially proceeds by the order of (i) "BEAM A OFF" in "separate 1", (ii) "BEAM B FULL TURNING ON" in "separate 1", (iii) "BEAM A TURNING ON" in "separate 2", and (iv) "BEAM B OFF" in "separate 2". In Embodiment 1, it is described that the potential in Example 2 of 2 dots is equal to one in Example 1.

As can be seen from this table, the case of 3 dots corresponds to a combination of the case of 1 dot and the case of 2 dots. Also, the case of 4 dots corresponds to a combination of the case of 2 dots and the case of 2 dots. Further, the case of 5 dots corresponds to a combination of the case of 1 dot, the case of 2 dots, and the case of 2 dots. The case of 5 dots or more similarly corresponds to a combination of the case(s) of 1 dot and/or the case(s) of 2 dots. Thus, even if any half tones are used and the write position is shifted, the equivalent potentials can be obtained by using the method of Embodiment 1.

On the other hand, in Embodiment 2, according to the flow chart shown in FIG. 11, only when one of the beams "A" and "B" is separately turned on in one scanning, is the PWM-turning on made. As Embodiment 1, the case of 3 dots or more is a combination of the case(s) of 1 dot and the case(s) of 2 dots in Embodiment 2. Thus, even if the write position is shifted, the equivalent potentials can be obtained by using the method of Embodiment 1.

Note that, according to the above embodiments, the image forming apparatus for forming the latent image on the photosensitive body by using two laser beams has been described. In the present invention, the number of laser beams is not limited to two. The present invention can be applied to the image forming apparatus using a large number of laser beams such as 4 beams or 8 beams.

As described above, according to the embodiments, a latent image forming means for pulse-width-modulating a drive signal of the semiconductor laser in accordance with the write portion of the latent image is provided. Therefore, when the exposure is made such that one beam of a plurality of semiconductor lasers is partially overlapped with a beam adjacent to the one beam of the plurality of semiconductor lasers on the photosensitive body, based on the reciprocity failure of the photosensitive body in the beam overlapping portion, a difference of the potentials produced by an image pattern (in the case where the light intensities of respective beams are summed then the beams are irradiated to the photosensitive body at once) and an image pattern (in the case where the intensities of respective beams are separately irradiated to the photosensitive body) can be canceled by turning on the beams pulse-width-modulated in response to the image pattern.

Also, in the case of the multi-beam, even if two beams have the same light intensity, since the potential in the case of simultaneous exposure is higher than that in the case of the separate exposure, the sensitivity is deteriorated. However, when the turning on time in the case of the separate exposure using the pulse width modulation is shortened, the potential can be made uniform. Then, since development with the toner is made in a state that the potential is uniform, the density is also made uniform.

Although preferable embodiments of the present invention have been described, the present invention is not limited to these embodiments, and modifications and variations may be made in the invention without departing from the spirit and scope of the following claims.

What is claimed is:

1. An image forming apparatus comprising:

scanning means for scanning a photosensitive body using a plurality of semiconductor lasers to form a latent image; and latent image forming means for pulse-width-modulating a drive signal of the semiconductor lasers in accordance with a write position of the latent image in the case that exposure is performed such that one beam from the plurality of semiconductor lasers is partially overlapped with an adjacent beam from the plurality of semiconductor lasers on the photosensitive body, wherein said latent image forming means does not pulse-width-modulate the drive signal in the case that at least two of the plurality of semiconductor lasers are simultaneously turned on in one scanning, and wherein the latent image forming means pulse-width-modulates the drive signal in the case that one beam from the plurality of semiconductor lasers which is turned on in one scanning is adjacent to one beam from the plurality of semiconductor lasers which is turned on in the next scanning.

2. An image forming apparatus comprising:

scanning means for scanning a photosensitive body using a plurality of semiconductor lasers to form a latent image; and latent image forming means for pulse-width-modulating a drive signal of the semiconductor lasers in accordance with a write position of the latent image in the case that exposure is performed such that one beam from the plurality of semiconductor lasers is partially overlapped with an adjacent beam from the plurality of semiconductor lasers on the photosensitive body, wherein said latent image forming means does not pulse-width-modulate the drive signal in the case that at least two of the plurality of semiconductor lasers are simultaneously turned on in one scanning, and wherein said latent image forming means pulse-width-modulates the drive signal in the case that one of the plurality of semiconductor lasers is turned on in one scanning.

3. An image forming method for scanning a photosensitive body using a plurality of semiconductor lasers to form a latent image, comprising the step of:

forming a latent image by modulating a drive signal of the semiconductor lasers by PWM in accordance with a write position of the latent image in the case that exposure is performed such that one beam from the plurality of semiconductor lasers is partially overlapped with an adjacent beam from the plurality of semiconductor lasers on the photosensitive body, wherein, in said latent image forming step, the drive signal is not modulated by PWM in the case that at least two of the plurality of semiconductor lasers are simultaneously turned on in one scanning, but is modulated by PWM in the case that one beam from the plurality of semiconductor lasers which is turned on in one scanning is adjacent to one beam from the plurality of semiconductor lasers which is turned on in a next scanning.

4. An image forming method for scanning a photosensitive body using a plurality of semiconductor lasers to form a latent image, comprising the step of:

forming a latent image by modulating a drive signal of the semiconductor lasers by PWM in accordance with a write position of the latent image in the case that exposure is performed such that one beam from the plurality of semiconductor lasers is partially overlapped with an adjacent beam from the plurality of semiconductor lasers on the photosensitive body, wherein, in said latent image forming step, the drive signal is not modulated by PWM in the case that at least two of the plurality of semiconductor lasers are simultaneously turned on in one scanning, but is modulated by PWM in the case that one of the plurality of semiconductor lasers is turned on in one scanning.

5. An image forming apparatus comprising:

a plurality of emitting means for emitting a plurality of light beams;

scanning means for scanning a common photosensitive body with the plurality of light beams emitted by said plurality of emitting means;

modulating means for modulating the plurality of light beams in accordance with respective image data; and control means for variably controlling an exposure amount of the plurality of light beams, in a case that image pixels, each of which is adjacent to another image pixel in a sub-scanning direction, are exposed in different scannings such that an exposure amount to expose at least one of the image pixels relatively decreases compared to a case that the image pixels are exposed in a common scanning.

6. An image forming apparatus according to claim 5, wherein said control means performs pulse-width modulation.

7. An image forming apparatus according to claim 5, comprising memory means for storing image data for at least one scanning.

8. An image forming apparatus according to claim 5, wherein the light beams are laser beams.

9. An image forming method comprising:

a step of emitting a plurality of light beams;

a step of scanning a common photosensitive body with the plurality of light beams emitted in said emitting step;

a step of modulating the plurality of light beams in accordance with respective image data; and a step of variably controlling an exposure amount of the light beams, in a case that image pixels, each of which is adjacent to another image pixel in a sub-scanning direction, are exposed in different scannings such that an exposure amount to expose at least one of the image pixels relatively decreases compared to a case that the image pixels are exposed in a common scanning.

* * * * *